United States Patent [19]

Furubayashi et al.

[11] Patent Number: 4,601,759

[45] Date of Patent: Jul. 22, 1986

[54] PIGMENT COMPOSITIONS, METHOD FOR PRODUCING SAME, AND COLORED RESIN COMPOSITIONS

[75] Inventors: Toshio Furubayashi; Takenori Funatsu; Yoichi Inuzuka; Osamu Aihara; Mikio Hayashi, all of Kyobashi, Japan

[73] Assignee: Toyo Ink Manufacturing Co., Ltd., Tokyo, Japan

[21] Appl. No.: 598,643

[22] Filed: Apr. 10, 1984

[30] Foreign Application Priority Data

Apr. 15, 1983 [JP] Japan ................................ 58-65232

[51] Int. Cl.[4] ........................... C08J 3/12; C09C 3/00; C09D 7/14
[52] U.S. Cl. ................................. 106/308 M; 106/20; 106/30; 106/288 B; 106/288 Q; 106/309
[58] Field of Search ............... 106/288 Q, 288 B, 309, 106/20, 308 M, 30

[56] References Cited

U.S. PATENT DOCUMENTS

| | | | |
|---|---|---|---|
| 3,730,747 | 5/1973 | Belde et al. | 106/288 Q |
| 3,843,380 | 10/1974 | Beyn | 106/309 |
| 4,173,492 | 11/1979 | Pollard | 106/308 Q |
| 4,188,236 | 2/1980 | Robertson et al. | 106/309 |
| 4,194,921 | 3/1980 | Wheeler et al. | 106/309 |

OTHER PUBLICATIONS

*Atritor Limited*, No. 420, p. 02, Dec. 28, 1984.

*Primary Examiner*—Amelia B. Yarbrough
*Attorney, Agent, or Firm*—Jordan and Hamburg

[57] ABSTRACT

The present invention relates to pigment compositions which comprise a wet cake of a pigment whose moisture content is reduced to a range from 2 to 19 wt % while keeping the pigment in the wet cake substantially unchanged in size and shape, and non-agglomerated. The method for preparing such pigment compositions is also disclosed in which the wet cake is dehydrated to have such moisture content as indicated above. The pigment compositions may be dispersed in resins or varnishes to obtain colored resin compositions which have excellent properties.

19 Claims, No Drawings

PIGMENT COMPOSITIONS, METHOD FOR PRODUCING SAME, AND COLORED RESIN COMPOSITIONS

This invention relates to pigment compositions comprising pigments and water which are ready to disperse and excellent in handling and a method for producing such pigment compositions. It also relates to colored resin compositions comprising the pigment compositions.

After drying to form powder, organic or inorganic pigments have been usually used as colorants in various fields. In some cases, they are used as various colorants in the form of wet cakes of pigments comprising large amounts of water. Where organic or inorganic pigments are used in the form of a dried powder, they are ordinarily beforehand treated at a temperature as high as 80° to 150° C. until their moisture content reaches below 1 wt%. This leads to dry agglomeration (the term "dry agglomeration" including dry aggregation) of pigment particles with attendant problems such as a change of hue, the lowering of transparency, tinting strength and gloss, a failure in dispersion. Thus, it is difficult to keep the high quality as experienced in wet cakes of pigments. Moreover, there are involved several other problems: the drying step requires a long time and a large amount of energy in order to remove almost all of the moisture from the pigment; an additional pulverizing step is required for converting the dried pigment to such a powder form as to be easily dispersed in various dispersion media; and upon handling of the powder, it will inevitably make dust, worsening working environments.

In general, a pigment contained in an aqueous suspension of pigment particles produced in a reaction vessel is made of very fine crystalline particles (called primary particles). Upon drying, agglomeration takes place, so that the fine particles formed on production of the pigment are not held as they are and agglomerated into large-size lumps called secondary particles. Even when the secondary particles are pulverized, it is very difficult to obtain particles having such a small size as crystalline particles obtained at the time of pigment formation. Sufficiently uniform dispersion of such particles in resins or varnishes undesirably requires a long time, and much energy and labor.

On the other hand, the wet cakes of pigment involves no agglomeration caused by drying, overcoming the disadvantages of the powder with good quality being obtained. However, the wet cake has ordinarily a moisture content as high as 45 to 90 wt%, showing a number of drawbacks or problems. It is not easy to handle or transport the wet cake. In cases where the wet cake is used in the preparation of aqueous paints, aqueous inks and aqueous dispersions for pigment printings, it is difficult to obtain them in a high pigment concentration. In case where printing inks are produced, it is usual to carry out a so-called flushing in which a wet cake of a pigment is kneaded with an ink varnish by means of a kneader such as a flusher while separating water. The separation of water from the wet cake of a high water content requires much energy and a long time and a large amount of the thus separated water must be discharged, needing a great detal of cost and an additional installation.

In Japanese Laid-open Patent Application No. 53568/1983, there is proposed a method which can overcome the above drawbacks of the powder or wet cake. In the method, a wet cake is shaped, for example, by the use of an extruder, in a form which is suitable for uniform drying and dried at a temperature of from 80° to 100° C. thereby obtaining a granular or rod-like pigment having a moisture content of from 20 to 55 wt%. However, this method has a number of disadvantages. The pigment obtained by this method is so high in moisture content and thus a highly concentrated pigment product as is required for aqueous dispersion media can hardly be obtained. The method still involves the problem of separating water at the time of flushing and discharging the separated water. The drying procedure of this method is same as in the known method of obtaining a pigment powder. Where it is intended to further lower the moisture content, long term and high temperature conditions are required, so that dry agglomeration tends to take place locally. The procedure is complicate because after extrusion, the resulting shaped pigment must be dried. Moreover, because of the particulate or rod-like shape, it is difficult to attain a uniform moisture content by drying.

We have made intensive studies to solve the problems of the prior art techniques and found pigment compositions which overcomes the prior art disadvantages.

According to one aspect of the invention, there is provided a pigment composition comprising a pigment and water characterized in that the pigment composition is a wet powder of a pigment whose moisture content is reduced to range from 2 to 19 wt% while keeping the pigment in the wet cake substantially unchanged in size and shape, and non-agglomerated.

According to another aspect of the invention, there is also provided a colored resin composition which comprises a dispersion, in a resin or varnish, of a pigment composition comprising a pigment and water which is a wet powder of a pigment whose moisture content is reduced to range from 2 to 19 wt% while keeping the pigment in the wet cake unchanged in size and shape and non-agglomerated.

According to a further aspect of the invention, there is provided a method for producing a pigment composition comprising a pigment and water which comprises subjecting a wet cake in the finely powdered form to dehydration to the extent the moisture content thereof reaches 2 to 19 wt%.

The pigments useful in the present invention may be either organic or inorganic. Preferably, organic pigments are used because they suffer the prior art problems more frequently. Pigments are not limited to any specific types. Examples of organic pigments are azo pigments, azo condensation pigments, phthalocyanine pigments, quinacridone pigments, indigo pigments, quinophthalone pigments, dioxane pigments, anthraquinone pigments, isoindolinone pigments, titanium white and the like.

The pigment composition according to the invention is a wet powder of a pigment in which the moisture content is reduced to 2–19 wt% while keeping the pigment in the wet cake unchanged in size and shape and non-agglomerated.

It is important that the wet cake of a pigment be kept unchanged in size and shape and non-agglomerated. Depending on the type of pigment, an aqueous suspension of pigment particles produced in a reaction vessel may be used as the starting wet cake of a pigment as it is. Alternatively, if a suspension of pigment particles produced in a reaction vessel has not a desired form of pigment or is agglomerated, such a suspension has to be subjected to any necessary treatments (or preparation of finished pigment) to keep a desired form which is available to pigmentation.

The form or state of agglomeration of a pigment is usually assessed by measurement of a particle size distribution of a pigment. Although not correctly or precisely assessed, the form or state of agglomeration may be evaluated as follows: whether or not a colored resin composition such as a printing ink, a paint or a colored resin may be readily obtained from a pigment composition without needing such an intensive grinding and kneading operation as is required in a prior art method using dry powder pigments.

Dehydration of a wet cake of a pigment may be carried out by any techniques without limitation provided that the pigment is not changed in size and shape and remains non-agglomerated during the dehydration. The wet cake should be dehydrated to a moisture content ranging from 2 to 19 wt% in a finely powdered state of the pigment, by which the wet cake suffers no change in size and shape, and non-agglomeration.

The term "finely powdered state" is intended to mean a state where a pigment in a wet cake is finely powdered by a powdering or pulverizing means and is kept finely powdered during or after the powdering. The term "fine powder or particles" which are not necessarily completely discrete particles but may be particles which undergo little local, excessive dehydration with only a slight degree of agglomerated if any. (Fine particles may be partially, continuously combined together)? The finely powdering may be effected by fluidizing, spraying or grinding means. The wet cake may be dehydrated to a desired moisture content while finely powdering and heating by suitable means. A finely powdering means and a heating means may be simultaneously applied to a wet cake for dehydration. Alternatively, a wet cake of a pigment may be first finely powdered and then heated while the wet pigment cake is in the finely powdered form to the extent that a desired moisture content thereof is reached. The heating is ordinarily effected by the use of hot air. Other heating means may be likewise used. The heating temperature is preferably determined such that the temperature of the wet cake itself (which may be hereinafter referred to temperature of cake or cake temperature) reaches 20° to 70° C. Although depending on the type of pigment, the temperature of cake exceeding 70° C. tends to cause pigment particles to be agglomerated. At too low cake temperatures, the operation efficiency will lower. Accordingly, the heating temperature is selected so that the temperature of cake is generally from 20° to 70° C., preferably from 20° to 50° C.

In general, when a wet cake is dried and dehydrated to a moisture content not higher than 1 wt%, the cake temperature will reach a temperature such as of hot air. In this connection, however, where the wet cake is treated such that its moisture content is in the range of from 1 to 19 wt% and the wet cake is finely powdered with a much increased drying area, it becomes possible to efficiently dry the wet cake at a low temperature of 20° to 70° C. in a moment.

As mentioned above, the fine powdering may be effected by a fluidizing, spraying or grinding means. In practice, an apparatus serving both fine powdering means and heating means is effectively used. Examples of such apparatus include Micron Dryer (by Hosokawa Micron Co., Ltd.) as the fluidized-bed dryer, Spray Dryer (by Niro Co., Ltd.) as the spray dryer, and Atritor (by Fuji Paudal Co., Ltd.), Cage Mill (by Ohtsuka Iron Work Co., Ltd.), Ring-roll Mill (Kurimoto Iron Work Co., Ltd.) and Loesche mill (Ube Kosan Co., Ltd.) as the air dryer, preferably, a Micron Dryer, Atritor or Cage Mill.

The treating procedure according to the invention is described in detail. A wet cake of a pigment having a moisture content of 45 to 90 wt% is charged into a grinding machine and subsequently hot air is passed into the machine while invariably grinding at a high speed in order to keep the wet cake uniform, thereby dehydrating to a moisture content of 2 to 19 wt% within a very short time or in a moment. By suitably controlling the temperature and amount of the hot air and the feed of the wet cake, the cake temperature is maintained at as low as 20° to 70° C., preferably 20° to 50° C. The moisture content is controlled to be in the range of 2 to 19 wt%, preferably 5 to 15 wt%. When the cake temperature exceeds 70° C. or the moisture content is lower than 2 wt% though depending on the type of pigment, pigment particles tend to be agglomerated. This will present problems such as a change in hue, lowering of transparency, tinting strength and gloss, and a failure in dispersion. It will be noted that in order to reduce a moisture content smaller than 2 wt%, a wet cake is treated at a temperature of cake ranging from 80° to 150° C. within a short time. The resulting product is inferior to a wet cake of a pigment and the pigment composition of the invention but is superior in properties to dry powder pigments. Presumably, this is because the efficient treatment within a short time results in a smaller degree of dry agglomeration of pigment particles than in the case of dry powder pigments.

In the practice of the invention, not only the cake temperature is low, but also the wet cake is invariably mixed or ground (when using a grinder), so that the cake is dehydrated in such a state that water is uniformly left in the cake. Accordingly, dry agglomeration of pigment particles is hard to occur.

The moisture content is generally in the range of from 2 to 19 wt%, preferably from 5 to 15 wt%. Lower moisture contents tend to cause pigment particles to be agglomerated as discussed above. Higher contents are unfavorable in that pigments are often deposited on a grinder and water droplets tend to be deposited on a collector (e.g. bag filter) or a duct in which a dew point is reached, making it difficult to perform the continuous operation. It should be noted that with pigments containing crystal water therein, crystal water which cannot be removed at cake temperatures below 80° C. is excluded on calculation of the moisture content in the practice of the invention.

The pigment composition of the invention has a number of advantages and features.

(1) Because dehydrating and grinding operations are complete prior to occurrence of dry agglomeration as is different from the case of dry powder pigment, hue, transparency, gloss and tinting strength are comparable to those attained by wet cakes of pigments.

(2) The composition has a moisture content lower than a wet cake of a pigment and is dispersed to give a dispersion product with a desired high concentration.

(3) When a wet cake of a pigment is dispersed in various dispersion media such as resins or varnishes, it is necessary that the hard cake is crushed for preliminary dispersion with a high speed mixer or a dissolver. However, use of the pigment composition of the invention facilitates the dispersion within a short time without need of any preliminary dispersion (i.e. good working performance).

(4) Handling, transport, packing and color mixing may be carried out in a manner similar to the case of dry pigment powder.

(5) In handling, the composition of the invention comprising fine particles containing water does not substantially produce any dust and does not worsen working environments. In this sense, the composition may be called "dustless pigment".

(6) No complicate steps of drying and grinding as required in dry pigment powder are necessary. Dehydration and grinder may be continuously, efficiently effected within a short time. Because the composition is not completely dehydrated, too large an amount of energy is not required.

(7) Especially, when a dry powder of a pigment is used for the preparation of printing inks, the powder has to be intensely kneaded with roller mills a number of times, whereupon the powder tends to be attached to the roller mills. Thus, much labor, time and energy are required with the resulting ink being inferior in hue, transparency, gloss and tinting strength to an ink from a wet cake of a pigment.

On the other hand, when a wet cake of a pigment is used, its handling and transport are very disadvantageous as compared with a dry pigment powder. Upon flushing, much labor, time and energy are required for separation of water from the cake with an additional treatment of water discharge (i.e. poor working performance).

Use of the pigment composition of the invention overcomes the drawbacks of both the powder and wet cake. From the composition is obtained a printing ink, within a short time in a less energy efficiency, which has such an excellent quality as an ink from a wet cake of a pigment. Because of the low moisture content, no procedure of separation water, i.e. flushing, is necessary without need of any drainage.

(8) Because of the low moisture content, the composition may be efficiently dispersed within a short time not only aqueous dispersion media or aqueous printing inks etc., but also non-aqueous dispersion media of the polar solvent type using alcohols etc. which may contain a small amount of water. As a result, colored dispersions of high quality can be obtained.

Likewise, when used in combination with non-aqueous dispersion media of the non-polar solvent type, dispersion media not affected by water remaining in small amounts, or dispersion media capable of removing water upon dispersion, the composition can yield colored dispersions of high quality.

The pigment composition of the invention may be classified, if necessary, prior to use and applied to prepare printing inks and paints etc.

As will be appreciated from the above, the present invention is very effective in industrially obtaining pigments of high purity.

Prior to, during or after preparation or dehydration, solvents, various resins, surface active agents and/or other additives may be added.

The present invention is described in more detail by way of examples, which should not be construed as limiting the present invention thereto.

EXAMPLE 1

3,3'-Dichlorobenzidine was diazotized by a usual manner to give a diazo component, followed by coupling-reaction, in water, with acetoacet-4-chloro-2,5-dimethoxyanilide thereby obtaining a Color Index (hereinafter referred to simply as C.I.) pigment yellow 83. Thereafter, the pigment was filtered under high pressure and washed with water to obtain a wet cake of the pigment having a moisture content of 65 wt% (comparative pigment A). This cake was treated under conditions indicated of Table 1 using an air dryer, Attritor made by Fuji Paudal Co., Ltd., thereby obtaining pigments of different moisture contents including 22 wt% (comparative pigment B), 18 wt% (inventive pigment 1), 13 wt% (inventive pigment 2), 6.5 wt% (inventive pigment 3), 3.5 wt% (inventive pigment 4), and 0.5 wt% (comparative pigment C). With the comparative pigment B having a moisture content of 22 wt%, it was considerably deposited on the walls of the dryer during the treatment and the continuous operation was impossible. With the inventive pigment 1 having a moisture content of 18 wt% deposition on the dryer walls occurred in a slight degree. The pigments of the invention having a moisture content ranging from 13 wt% to 3.5 wt% presented no problems and the intended pigment compositions could be readily obtained.

TABLE 1

| Treating Condition | Treating Conditions of C.I. Pigment Yellow 83 | | | | | |
|---|---|---|---|---|---|---|
| | Moisture Content (wt %) | | | | | |
| | 22 | 18 | 13 | 6.5 | 3.5 | 0.5 |
| Inlet Temperature (°C.) | 160 | 190 | 220 | 230 | 250 | 300 |
| Exhaustion Temperature (°C.) | 50 | 55 | 60 | 65 | 70 | 90 |
| Rate of Hot Air (m³/min.) | 35 | 45 | 48 | 48 | 50 | 53 |
| Feed (Kg-wet/hr) | 300 | 260 | 220 | 220 | 230 | 220 |
| Temperature of cake (°C.) | 25 | 24 | 24 | 24 | 26 | 30 |
| Revolutions of Grinder (r.p.m.) | 1500 | 1500 | 1500 | 1500 | 1500 | 1500 |

*The hot air temperature was same as the inlet temperature.

The inventive pigment 2 having a moisture content of 13 wt% was subjected to the measurement of a size distribution using the "Luzex" size distribution-measuring instrument (Nihon Regulator Co., Ltd.) with the results shown in Table 2-1.

TABLE 2-1

| Size Distribution of C.I. Pigment Yellow 83 | | | | |
|---|---|---|---|---|
| over 0.8 (mm) | 0.8–0.35 | 0.35–0.15 | 0.15–0.07 | below 0.07 |
| 0.4 (%) | 3.2 | 13.7 | 22.6 | 60.1 |

Thereafter, the wet cake of the pigment as used above was allowed to stand for drying at 80° C. in a generally-used tray dryer, followed by crushing with a hammer crusher to obtain comparative pigment D (moisture content: 13 wt%), comparative pigment E (moisture content: 6.5 wt%), and comparative pigment F (moisture content: 0.3 wt%). Upon crushing of the pigments D and E, they highly attached to the dryer walls and the hammer, making it difficult to crush.

TABLE 2-2

| | Size Distribution of Comparative Pigment D | | | |
|---|---|---|---|---|
| over 0.8 (mm) | 0.8–0.35 | 0.35–0.15 | 0.15–0.07 | below 0.07 |
| 0.8 (%) | 5.2 | 15.9 | 50.5 | 27.6 |

In crushing comparative pigment D, the pigment was fed at a rate of 200 kg/hr, crushed at a peripheral velocity of 100 m/sec and sieved with a screen of 3 mmφ.

The pigments 1, 2, 3 and 4 of the present invention and the comparative pigments A, B, C, D, E and F were tested for comparison.

OFF-SET INK TEST

An off-set ink varnish (that is, a dispersing composition for the pigment) (rosin-modified phenolic resin) and each of the pigments were kneaded on three roller mills at a temperature below 60° C. to give an original color ink having a pigment content of 20 wt% (an ink was sampled every rolling operation and large-size particles were observed by the grind-O-meter to evaluate the dispersibility). When a wet cake (comparative pigment A) is kneaded, water is flushed to separate therefrom. Thus, said water is carefully removed during the kneading. The resulting ink was mixed with a solvent so that its tack and fluidity was adjusted suitable for printing. Thus adjusted ink was printed on an art paper by the use of a proof press, by Akira Mfg. Co., Ltd., and was subjected to measurement of gloss at an angle of incidence of 60° by means of the gloss meter made by Suga Tester Co., Ltd. Moreover, the color was measured by the color machine made by Color Machine Co., Ltd., to judge a brightness and an intensity of the hue. Subsequently, the ink was applied onto an art paper on which a black ink had first applied, thereby determining its transparency by visual observation. As will be seen from Table 3, the off-set inks using the pigments of the invention showed good results in all test items. The assessment is as follows. o: excellent, Δ: good, and x: poor.

TABLE 3

| | Off-set Ink Test of C.I. Pigment Yellow 83 | | | | | |
|---|---|---|---|---|---|---|
| | | Results of Assessment | | | | |
| | Gloss | Brightness of Hue | Intensity | Transparency | Dispersibility | Working Performance |
| Pigment 1 of Invention | o | o | o | o | o | o–Δ |
| Pigment 2 of Invention | o | o | o | o | o | o |
| Pigment 3 of Invention | o | o | o | o | o | o |
| Pigment 4 of Invention | o | o | o | o–Δ | o | o |
| Comparative Pigment A | o | o | o | Δ | o | x |
| Comparative Pigment B | o | Δ | o | o | o | x |
| Comparative Pigment C | o | Δ | o | Δ | Δ | o |
| Comparative Pigment D | x | Δ | x | x | x | x |
| Comparative Pigment E | x | Δ | x | x | x | x |
| Comparative Pigment F | x | x | x | x | x | o |

As will be clear from the above table, the pigments of the invention are much more excellent in properties including dispersibility than the comparative pigments D, E, F which are obtained by drying the wet cake under static conditions and crushing the dried cake. It will be noted that in tables appearing hereinafter, the working performance is omitted.

AQUEOUS FLEXO INK TEST

A water-soluble styrene-acrylic copolymer resin varnish and each of the pigments were dispersed in a sand mill until coarse particles disappeared to obtain an original color ink having a pigment content of 15 wt%. During the dispersion, an ink was sampled at certain intervals of time and coarse particles were observed by a grind gauge to evaluate the dispersibility. The resulting ink was developed on a manila board paper and its gloss and hue brightness were evaluated by the use of the tester indicated before. The ink was applied onto a hiding power chart to determine the transparency. Two inks were subsequently mixed to have a mixing ratio of the yellow pigment in the original color ink and a blue pigment in the blue ink of 10:1 and then developed thereby visually observing the tinting strength. The aqueous flexo inks obtained from the pigments of the invention showed good results with respect to all the test items.

TABLE 4

| | Aqueous Flexo Ink Test of C.I. Pigment Yellow 83 | | | | |
|---|---|---|---|---|---|
| | Gloss | Brightness of Hue | Tinting Strength | Transparency | Dispersibility |
| Pigment 1 of Invention | o | o | o | o | o |
| Pigment 2 of Invention | o | o | o | o | o |
| Pigment 3 of Invention | o | o | o | o | o |
| Pigment 4 of Invention | o | o | o | o–Δ | o |
| Comparative Pigment A | o | o | o | o | o |
| Comparative Pigment B | o | Δ | o | o | o |
| Comparative Pigment C | o | Δ | o | Δ | Δ |
| Comparative Pigment D | x | Δ | x | x | x |
| Comparative Pigment E | x | Δ | x | x | x |

TABLE 4-continued

Aqueous Flexo Ink Test of C.I. Pigment Yellow 83

| | Gloss | Brightness of Hue | Tinting Strength | Transparency | Dispersibility |
|---|---|---|---|---|---|
| Comparative Pigment F | x | x | x | x | x |

POLYVINYL CHLORIDE TEST

DOP (dioctyl phthalate) and each of the pigments were kneaded on three roller mill at a temperature below 50° C. to obtain a color paste having a pigment content of 50 wt% (a color paste was sampled every cycle of rolling operations and coarse particles in the paste were observed by the grind-o-meter to evaluate the dispersibility). Since water is flushed to separate from the wet cake (comparative pigment A) during the kneading thereof, it is carefully removed during the kneading. The color paste was then kneaded with a soft polyvinyl chloride resin [ZEON 102EP (Nihon Zeon Co., Ltd.)] on two roller mill at a temperature of from 150° to 155° C. to obtain a colored compound a pigment content of 0.5 wt%. The colored compound was compressed at a temperature of 165° C. under a load of 150 Kg/cm$^2$ to obtain a full shade color sheet. This sheet was visually observed to determine brightness of hue and transparency. The color paste and a blue color paste were kneaded with a polyvinyl chloride compound such that the yellow pigment in the color paste and a blue pigment in the blue color paste were mixed in a ratio of 10:1, followed by making a sheet in the same manner as described above to determine a tinting strength. As will be seen from Table 5, the polyvinyl chloride sheets using the pigments of the invention show good results in the respective test items.

TABLE 5

Polyvinyl Chloride Test of C.I. Pigment Yellow 83

| | Brightness of Hue | Transparency | Tinting Strength | Dispersibility |
|---|---|---|---|---|
| Pigment 1 of Invention | o | o | o | o |
| Pigment 2 of Invention | o | o | o | o |
| Pigment 3 of Invention | o | o | o | o |
| Pigment 4 of Invention | o | o-Δ | o | o |
| Comparative Pigment A | o | Δ | o | o |
| Comparative Pigment B | Δ | o | o | o |
| Comparative Pigment C | Δ | Δ | o | Δ |
| Comparative Pigment D | Δ | x | x | x |
| Comparative Pigment E | Δ | x | x | x |
| Comparative Pigment F | x | x | x | x |

NITROCELLULOSE GRAVURE INK TEST

Nitrocellulose and each of the pigments were kneaded along with a plasticizer and a solvent to give nitrocellulose chips having a pigment content of 50 wt% (the evaluation of the dispersibility was effected in the same manner as in the off-set ink). Since water is flushed to separate from the wet cake (comparative pigment A) during the kneading thereof, the water is carefully removed during the kneading. The chips were dispersed along with a nitrocellulose varnish, a solvent and alumina beads in a paint conditioner to obtain an original color ink having a pigment content of 10%. This ink was applied onto a triacetate film and subjected to evaluation of gloss and brightness of hue by the use of the afore-indicated tester. The ink was also applied onto a hiding power chart for determining transparency. The original color ink was mixed with a blue ink so that a ratio of the yellow pigment in the original color ink and a blue pigment in the blue ink was 10:1. The ink mixture was applied on triacetate film and subjected to visually determine the tinting strength. As will be seen from Table 6 the nitrocellulose gravure inks comprising the pigments of the invention showed good results in the respective test items.

TABLE 6

Nitrocellulose Gravure Ink Test of C.I. Pigment Yellow 83

| | Gloss | Brightness of Hue | Tinting Strength | Transparency | Dispersibility |
|---|---|---|---|---|---|
| Pigment 1 of Invention | o | o | o | o | o |
| Pigment 2 of Invention | o | o | o | o | o |
| Pigment 3 of Invention | o | o | o | o | o |
| Pigment 4 of Invention | o | o | o | o-Δ | o |
| Comparative Pigment A | Δ | o | o | Δ | o |
| Comparative Pigment B | Δ | Δ | o | o | Δ |
| Comparative Pigment C | o | Δ | o | Δ | Δ |
| Comparative Pigment D | Δ | Δ | x | Δ | x |
| Comparative Pigment E | Δ | Δ | x | x | x |
| Comparative Pigment F | x | x | x | x | x |

ALKYD-MELAMINE RESIN-BAKING PAINT TEST

An alkyd resin varnish having an oil length of 33% and each of the pigments were kneaded on a three roller mill until coarse particles disappeared, thereby obtaining an original color base enamel having a pigment content of 30 wt% (the dispersibility was evaluated in the same manner as in the aqueous flexo ink). Since water is flushed to separate from the wet cake (comparative pigment A) during the kneading thereof, the water is carefully removed during the kneading. This original color base enamel was mixed with an alkyd resin varnish, a butylolmelamine varnish and a solvent to obtain an original enamel having a pigment content of 6 wt%. This enamel was mixed further with a solvent to have a viscosity sufficient for spraying, after which it was applied onto a test metal panel and baked, followed by evaluating the gloss and brightness of hue by the tester indicated before. Thereafter, the original color enamel and a blue enamel were mixed so that a ratio of the yellow pigment in the original color enamel and a blue pigment in the blue enamel was 10:1. The mixture was applied and baked onto a test metal panel and subjected to determine a tinting strength. As will be seen from Table 7, the alkyd-melamine resin-baking paints using the pigments of the invention showed good results in the respective test items.

TABLE 7

Alkyd-Melamine Resin-baking Paint Test of C.I. Pigment Yellow 83

| | Gloss | Brightness of Hue | Tinting Strength | Dispersibility |
|---|---|---|---|---|
| Pigment 1 of Invention | o | o | o | o |
| Pigment 2 of Invention | o | o | o | o |
| Pigment 3 of Invention | o | o | o | o |
| Pigment 4 of Invention | o | o | o | o |
| Comparative Pigment A | Δ | o | o | o |
| Comparative Pigment B | Δ | o | o | Δ |
| Comparative Pigment C | o | Δ | o | Δ |
| Comparative Pigment D | x | Δ | Δ | x |
| Comparative Pigment E | x | Δ | x | x |
| Comparative Pigment F | x | x | x | x |

WATER-BORNE ACRYLIC RESIN-BAKING PAINT TEST

A water-borne acrylic resin for baking paint and each of the pigments were mixed in a ball mill until coarse particles were not found, thereby obtaining an original color base enamel having a pigment content of 20 wt% (the dispersibility was evaluated in the same manner as in the aqueous flexo ink). To the base enamel were added a water-soluble acrylic resin, a water-soluble melamine resin, water and a solvent, thereby giving an original color enamel having a pigment content of 5 wt%. After adjustment of the enamel to a viscosity suitable for spraying, the enamel was applied onto a test metal panel and baked to evaluate gloss and brightness of hue of the resulting coating.

The original color enamel and a blue enamel were mixed so that a ratio of the yellow pigment in the original color enamel and a blue color in the blue enamel was 10:1. The mixed enamel was applied and baked onto a test metal panel and subjected to determine a tinting strength. As will be seen from Table 8, the water-soluble acrylic resin-baking paints using the pigments of the invention showed good results in the respective test items.

TABLE 8

Water-soluble Acrylic Resin Paint Test of C.I. Pigment Yellow 83

| | Gloss | Brightness of Hue | Tinting Strength | Dispersiblity |
|---|---|---|---|---|
| Pigment 1 of Invention | o | o | o | o |
| Pigment 2 of Invention | o | o | o | o |
| Pigment 3 of Invention | o | o | o | o |
| Pigment 4 of Invention | o | o | o | o |
| Comparative Pigment A | Δ | o | o | o |
| Comparative Pigment B | Δ | Δ | o | Δ |
| Comparative Pigment C | o | Δ | o | Δ |
| Comparative Pigment D | x | Δ | x | x |
| Comparative Pigment E | x | Δ | x | x |
| Comparative Pigment F | x | x | x | x |

PIGMENT PRINTING TEST

A nonionic active agent (polyoxyethylene allyl ether), each of the pigments, water and an additive were mixed in a high speed mixer and kneaded in a sand mill until coarse particles were not observed, thereby obtaining a concentrated color having a pigment content of 20 wt%. This concentrated color and a binder (of an emulsified acrylic polymer) were mixed with a reducer consisting of an O/W emulsion to obtain a thick color having a pigment content of 2 wt% and a light color having a pigment content of 0.2 wt%. The respective colors were each printed on a cotton cloth and thermally treated to visually judge the brightness of hue and tinting strength thereof. As will be seen from Table 9, the colors for pigment printing using the pigments of the invention showed good results.

TABLE 9

Pigment Printing Test of C.I. Pigment Yellow 83

| | Brightness of Hue | Tinting Strength | Dispersibility |
|---|---|---|---|
| Pigment 1 of Invention | o | o | o |
| Pigment 2 of Invention | o | o | o |
| Pigment 3 of Invention | o | o | o |
| Pigment 4 of Invention | o | o | o |
| Comparative Pigment A | o | o | o |
| Comparative Pigment B | Δ | o | Δ |
| Comparative Pigment C | Δ | o | Δ |
| Comparative Pigment D | Δ | x | x |
| Comparative Pigment E | Δ | x | x |
| Comparative Pigment F | x | x | x |

EXAMPLE 2

Crude copper phthalocyanine, common salt and polyethylene glycol were kneaded in a kneader for 5 hours, followed by filtering and washing with water to remove the common salt and polyethylene glycol therefrom, thereby obtaining a pigment wet cake of pigmented C.I. pigment blue 15:3 having a moisture content of 70 wt% (comparative pigment A). This cake was treated, under conditions indicated in Table 10, using a fluidized bed dryer, Micron Dryer, by Hosokawa Micron Co., Ltd., thereby obtaining a pigment having a moisture content of 25 wt% (comparative pigment B), and dustless pigments of the invention having moisture contents of 12 wt% (inventive pigment 1) and 7 wt% (inventive pigment 2), respectively. The cake of the type indicated above (comparative pigment 1) was allowed to stand and dried in a tray dryer of 80° C., after which it was crushed by a hammer crusher to obtain pigments having a moisture content of 7 wt% (comparative pigment C) and a moisture content of 0.5 wt% (comparative pigment D).

TABLE 10

Treating Conditions of C.I. Pigment Blue 15:3

| Treating Conditions | Moisture Content (wt %) | | |
|---|---|---|---|
| | 25 | 12 | 7 |
| Inlet Temperature (°C.) | 150 | 220 | 280 |
| Exhaust Temperature (°C.) | 40 | 60 | 73 |
| Amount of Hot Air (m³/min) | 40 | 60 | 95 |
| Feed (kg-wet cake/hr) | 450 | 450 | 425 |
| Cake Temperature (°C.) | 20 | 35 | 50 |
| Revolutions of Crusher (r.p.m.) | 1150 | 1150 | 1150 |

The inventive pigment 2 having a moisture of 7 wt% was subjected to measurement of a size distribution using the "Luzex" size distribution-measuring instrument, with the results shown in Table 11.

TABLE 11

Size Distribution of C.I. Pigment Blue 15:3

| over 0.8 (mm) | 0.8–0.35 | 0.35–0.15 | 0.15–0.07 | below 0.07 |
|---|---|---|---|---|
| 0.6 (%) | 4.2 | 14.3 | 24.2 | 56.7 |

The pigments of the present invention and the comparative pigments A through D were tested in the same manner as in Example 1. The tinting strength was determined by mixing inks, enamels or colors so that the blue pigment and a white pigment were mixed in a ratio of 1:10. The results are shown in Tables 12 through 18, revealing that the colored dispersions using the pigments of the invention showed good results.

TABLE 12

Off-set Ink Test of C.I. Pigment Blue 15:3

| | Gloss | Brightness of Hue | Intensity | Transparency | Working Performance |
|---|---|---|---|---|---|
| Pigment 1 of Invention | o | o | o | o | o |
| Pigment 2 of Invention | o | o | o | o | o |
| Comparative Pigment A | o | o | o | o | x |
| Comparative Pigment B | o | Δ | o | o | x |
| Comparative Pigment C | x | Δ | Δ | x | x |
| Comparative Pigment D | x | Δ | x | x | o |

TABLE 13

Aqueous Flexo Ink Test of C.I. Pigment Blue 15:3

| | Gloss | Brightness of Hue | Tinting Strength | Transparency |
|---|---|---|---|---|
| Pigment 1 of Invention | o | o | o | o |
| Pigment 2 of Invention | o | o | o | o |
| Comparative Pigment A | o | o | o | o |
| Comparative Pigment B | o | Δ | o | o |
| Comparative Pigment C | x | Δ | x | x |
| Comparative Pigment D | x | Δ | x | x |

TABLE 14

Polyvinyl Chloride Test of C.I. Pigment Blue 15:3

| | Brightness of Hue | Transparency | Tinting Strength |
|---|---|---|---|
| Pigment 1 of Invention | o | o | o |
| Pigment 2 of Invention | o | o | o |
| Comparative Pigment A | o | o | o |
| Comparative Pigment B | Δ | o | o |
| Comparative Pigment C | Δ | x | x |
| Comparative Pigment D | Δ | x | x |

TABLE 15

Nitrocellulose Gravure Ink Test of C.I. Pigment Blue 15:3

| | Gloss | Brightness of Hue | Tinting Strength | Transparency |
|---|---|---|---|---|
| Pigment 1 of Invention | o | o | o | o |
| Pigment 2 of Invention | o | o | o | o |
| Comparative Pigment A | Δ | o | o | Δ |
| Comparative Pigment B | o | Δ | o | o |
| Comparative Pigment C | x | Δ | x | Δ |
| Comparative Pigment D | x | Δ | x | Δ |

TABLE 16

Alkyd-Melamine Resin-baking Paint Test of C.I. Pigment Blue 15:3

| | Gloss | Brightness of Hue | Tinting Strength |
|---|---|---|---|
| Pigment 1 of Invention | o | o | o |
| Pigment 2 of Invention | o | o | o |
| Comparative Pigment A | Δ | o | o |
| Comparative Pigment B | o | Δ | o |
| Comparative Pigment C | x | Δ | x |
| Comparative Pigment D | x | Δ | x |

TABLE 17

Water borne Acrylic Paint Test of C.I. Pigment Blue 15:3

| | Gloss | Brightness of Hue | Tinting Strength |
|---|---|---|---|
| Pigment 1 of Invention | o | o | o |
| Pigment 2 of Invention | o | o | o |
| Comparative Pigment A | Δ | o | o |
| Comparative Pigment B | o | Δ | o |
| Comparative Pigment C | x | Δ | x |
| Comparative Pigment D | x | Δ | x |

TABLE 18

Pigment Printing Test of C.I. Pigment Blue 15:3

|  | Brightness of Hue | Tinting Strength |
|---|---|---|
| Pigment 1 of Invention | o | o |
| Pigment 2 of Invention | o | o |
| Comparative Pigment A | o | o |
| Comparative Pigment B | Δ | o |
| Comparative Pigment C | x | x |
| Comparative Pigment D | x | x |

EXAMPLE 3

6-Amino-4-chloro-m-toluenesulfonic acid was diazotized by a usual manner, followed by coupling with 3-hydroxy-2-naphthoic acid and laking with a water-soluble manganese salt to prepare C.I. pigment red 48:4. Thereafter, it was heated to 90° C., filtered by pressing under high pressure and washed with water to obtain a wet pigment cake having a moisture content of 48 wt% (comparative pigment A). This cake was dried in a cage mill, i.e. an air dryer, by Ohtsuka Iron Work Co., Ltd., thereby obtaining a dustless pigment of the invention having a moisture content of 10 wt%. The treating conditions of the cage mill were an inlet temperature of 250° C., an exhaust temperature of 65° C., and amount of hot air of 80 m³/min, a feed of 350 kg-wet cake/hour, a cake temperature of 35° C., and the number of revolutions of the crusher of 1300 r.p.m. Moreover, the cake of the same type as used above was allowed to stand and dried in a tray dryer of 90° C., followed by crushing in a hammer crusher to obtain a comparative pigment B having a moisture content of 1.0 wt% except for the crystal water contained therein.

The pigment of the invention having a moisture content of 10 wt% was subjected to measurement of a size distribution using the "Luzex", with the results shown in Table 19 below.

TABLE 19

Size Distribution of C.I. Pigment Red 48:4

| over 0.8 (mm) | 0.8–0.35 | 0.35–0.15 | 0.15–0.07 | below 0.07 |
|---|---|---|---|---|
| 0.2 (%) | 8.6 | 18.2 | 31.3 | 41.7 |

The pigment of the invention and the comparative pigments A, B were tested in the same manner as in Example 1 except that the tinting strength was judged according to the method of Example 2. The results are shown in Tables 20 through 23. In all the tests, the color dispersions using the pigment of the invention showed good results.

TABLE 20

Aqueous Flexo Ink Test of C.I. Pigment Red 48:4

|  | Gloss | Brightness of Hue | Tinting Strength | Transparency |
|---|---|---|---|---|
| Pigment of Invention | o | o | o | o |
| Comparative Pigment A | o | o | o | o |
| Comparative Pigment B | x | Δ | x | x |

TABLE 21

Nitrocellulose Gravure Ink Test of C.I. Pigment Red 48:4

|  | Gloss | Brightness of Hue | Tinting Strength | Transparency |
|---|---|---|---|---|
| Pigment of Invention | o | o | o | o |
| Comparative Pigment A | Δ | o | o | Δ |
| Comparative Pigment B | x | Δ | x | x |

TABLE 22

Alkyd-Melamine Resin-baking Paint Test of C.I. Pigment Red 48:4

|  | Gloss | Brightness of Hue | Tinting Strength |
|---|---|---|---|
| Pigment of Invention | o | o | o |
|  | o | o |  |
| Comparative Pigment A | Δ | o | o |
| Comparative Pigment B | x | Δ | x |

TABLE 23

Water-borne Acrylic Paint Test of C.I. Pigment Red 48:4

|  | Gloss | Brightness of Hue | Tinting Strength |
|---|---|---|---|
| Pigment of Invention | o | o | o |
|  | o |  |  |
| Comparative Pigment A | Δ | o | o |
| Comparative Pigment B | x | Δ | x |

EXAMPLE 4

N',N'-Diethyl-4-methoxymetanylamide was diazotized by a usual manner and subjected to coupling reaction with 5'-chloro-3-hydroxy-2',4'-dimethoxy-2-naphthalanilide to prepare C.I. pigment red 5, followed by filtering by pressing under high pressure and washing with water to obtain a wet pigment cake having a moisture content of 40 wt% (comparative pigment A). The cake was dried in an air dryer, Attritor, by Fuji Paudal Co., Ltd., to obtain a dustless pigment of the invention having a moisture content of 7 wt%. The cake was also allowed to stand and dried in a tray dryer at 120° C. and crushed by a hammer crusher to obtain a comparative pigment B having a moisture content of 0.8 wt%.

The pigment of the invention having a moisture content of 7 wt% was subjected to measurement of a size distribution using the "Luzex". The results are shown in Table 24.

TABLE 24

Size Distribution of C.I. Pigment Red 5

| over 0.8 (mm) | 0.8–0.35 | 0.35–0.15 | 0.15–0.07 | below 0.07 |
|---|---|---|---|---|
| 0.1 (%) | 2.1 | 16.3 | 28.4 | 53.1 |

The pigment of the invention and the comparative pigments A, B were tested in the same manner as in Example 1. It will be noted that the tinting strength was evaluated according to the method of Example 2. The results are shown in Tables 25 through 28, revealing that the colored dispersion using the pigment of the invention showed good results in all the tests.

TABLE 25

Aqueous Flexo Ink Test of C.I. Pigment Red 5

| | Gloss | Brightness of Hue | Tinting Strength | Transparency |
|---|---|---|---|---|
| Pigment of Invention | o | o | o | o |
| Comparative Pigment A | Δ | o | o | o |
| Comparative Pigment B | x | Δ | x | x |

TABLE 26

Alkyd-Melamine Resin-baking Paint Test of C.I. Pigment Red 5

| | Gloss | Brightness of Hue | Tinting Strength |
|---|---|---|---|
| Pigment of Invention | o | o | o |
| Comparative Pigment A | Δ | o | o |
| Comparative Pigment B | x | Δ | x |

TABLE 27

Water borne Acrylic Paint Test of C.I. Pigment Red 5

| | Gloss | Brightness of Hue | Tinting Strength |
|---|---|---|---|
| Pigment of Invention | o | o | o |
| Comparative Pigment A | o | o | o |
| Comparative Pigment B | x | Δ | x |

TABLE 28

Pigment Printing Test of C.I. Pigment Red 5

| | Brightness of Hue | Tinting Strength |
|---|---|---|
| Pigment of Invention | o | o |
| Comparative Pigment A | o | o |
| Comparative Pigment B | x | x |

EXAMPLE 5

Crude dioxazine violet, common salt and polyethylene glycol were kneaded in a kneader for 7 hours, followed by filtering and washing with water to remove the common salt and polyethylene glycol therefrom, thereby obtaining a wet cake of C.I. pigment violet 23 having a moisture content of 65 wt% (comparative pigment A). This cake was treated in an air dryer, Attritor, of Fuji Paudal Co., Ltd., to obtain a dustless pigment of the invention having a moisture content of 5 wt%. The cake was also dried at 100° C. by a tray dryer and crushed by a hammer crusher to obtain a comparative pigment B having a moisture content of 0.5 wt%.

The pigment of the present invention having a moisture content of 5 wt% was subjected to measurement of a size distribution using the Luzex size distribution-measuring instrument. The results are shown in Table 29.

TABLE 29

Size Distribution of C.I. Pigment Violet 23

| over 0.8 (mm) | 0.8–0.35 | 0.35–0.15 | 0.15–0.07 | below 0.07 |
|---|---|---|---|---|
| 0.6 (%) | 3.8 | 14.2 | 25.2 | 56.2 |

The pigment of the invention and the comparative pigments A, B were tested in the same manner as in Example 1. It will be noted that the tinting strength was evaluated according to the method of Example 2. The results are shown in Tables 30 through 33, revealing that the colored dispersion using the pigment of the invention showed good results in all the tests.

TABLE 30

Aqueous Flexo Ink Test of C.I. Pigment Violet 23

| | Gloss | Brightness of Hue | Tinting Strength | Transparency |
|---|---|---|---|---|
| Pigment of Invention | o | o | o | o |
| Comparative Pigment A | o | o | o | o |
| Comparative Pigment B | x | x | x | Δ |

TABLE 31

Polyvinyl Chloride Test of C.I. Pigment Violet 23

| | Brightness of Hue | Transparency | Tinting Strength |
|---|---|---|---|
| Pigment of Invention | o | o | o |
| Comparative Pigment A | o | o | o |
| Comparative Pigment B | x | x | Δ |

TABLE 32

Nitrocellulose Gravure Ink Test of C.I. Pigment Violet 23

| | Gloss | Brightness of Hue | Tinting Strength | Transparency |
|---|---|---|---|---|
| Pigment of Invention | o | o | o | o |
| Comparative Pigment A | Δ | o | o | o |
| Comparative Pigment B | x | x | x | x |

TABLE 33

Pigment Printing Test of C.I. Pigment Violet 23

| | Brightness of Hue | Tinting Strength |
|---|---|---|
| Pigment of Invention | o | o |
| Comparative Pigment A | o | o |
| Comparative Pigment B | x | x |

EXAMPLE 6

A wet pigment cake (comparative pigment A) of titanium oxide of the rutile structure which had been treated on the surface thereof with aluminium oxide and silicon oxide and which had a moisture content of 50 wt% was dried in an air dryer, Attritor, by Fuji Paudal Co., Ltd., to obtain a dustless pigment of the invention having a moisture content of 7 wt%. The cake was also treated by allowing it to stand and drying at 100° C. by means of a tray dryer and crushing with a hammer crusher to obtain a comparative pigment B having a moisture content of 0.2 wt%.

The pigment of the present invention having a moisture content of 7 wt% was subjected to measurement of a size distribution using the "Luzex". The results are shown in Table 34.

TABLE 34

Size Distribution of C.I. Pigment violet 23

| over 0.8 (mm) | 0.8–0.35 | 0.35–0.15 | 0.15–0.07 | below 0.07 |
|---|---|---|---|---|
| 0.1 (%) | 1.1 | 6.2 | 18.2 | 74.2 |

The pigment of the invention and the comparative pigments A, B were tested in the same manner as in Example 1. The results are shown in Tables 35 through 38, revealing that the colored dispersions using the pigment of the invention showed good results in all the tests. It will be noted here that the tinting strength was evaluated by mixing inks, enamels or colors so that black and white pigments were in a mixing ratio of 1:5.

TABLE 35

Aqueous Flexo Ink Test of Titanium Oxide

|  | Gloss | Brightness of Hue | Tinting Strength |
|---|---|---|---|
| Pigment of Invention | o | o | o |
| Comparative Pigment A | o | o | o |
| Comparative Pigment B | Δ | Δ | Δ |

TABLE 36

Polyvinyl Chloride Test of Titanium Oxide

|  | Brightness of Hue | Tinting Strength |
|---|---|---|
| Pigment of Invention | o | o |
| Comparative Pigment A | o | o |
| Comparative Pigment B | Δ | Δ |

TABLE 37

Nitrocellulose Gravure Ink Test of Titanium Oxide

|  | Gloss | Brightness of Hue | Tinting Strength |
|---|---|---|---|
| Pigment of Invention | o | o | o |
| Comparative Pigment A | o | o | o |
| Comparative Pigment B | Δ | Δ | Δ |

TABLE 38

Water borne Acrylic Resin-baking Paint Test of Titanium Oxide

|  | Gloss | Brightness of Hue | Tinting Strength |
|---|---|---|---|
| Pigment of Invention | o | o | o |
| Comparative Pigment A | o | o | o |
| Comparative Pigment B | Δ | Δ | Δ |

What is claimed is:

1. A method for preparing a pigment composition comprising a pigment and water, comprising the steps of dehydrating a wet cake of a pigment in a finely powdered state to such an extent that the resulting moisture content is from 2 to 19 wt.% while maintaining the pigment in the wet cake substantially unchanged in size and shape, and non-agglomerated.

2. The method according to claim 1, wherein said dehydrating comprises heating said wet cake while maintaining said wet cake in said finely powdered state.

3. The method according to claim 2, wherein said heating is effected using hot air.

4. The method according to claim 1 comprising grinding said wet cake to obtain said finely powdered state.

5. The method according to claim 1 comprising fluidizing said wet cake to obtain said finely powdered state.

6. The method according to claim 1 comprising spraying said wet cake to obtain said finely powdered state.

7. The method according to claim 1, wherein dehydration is effected at a temperature to heat the wet cake to 20° to 70° C.

8. The method according to claim 1, wherein the pigment is organic.

9. The method according to claim 1, wherein the dehydration is effected to obtain a moisture content of 4 to 15 wt.%.

10. A colored resin composition comprising a pigment composition dispersed in a resin or coating composition, said pigment composition comprising a pigment and water, said pigment composition being obtained by reducing a wet cake of a pigment in a finely powdered state to that having a moisture content ranging from 2 to 19 wt.% while simultaneously maintaining said pigment in the wet cake substantially unchanged in size and shape, and non-agglomerated.

11. The colored resin composition according to claim 10, wherein said pigment is organic.

12. The colored resin composition according to claim 10, wherein the pigment composition has a moisture content ranging from 5 to 15 wt.%.

13. A method of preparing a composition comprising a pigment and water in which said composition is readily handled and transported and which does not require intensive grinding or kneading and does not require flushing when subsequently used in a colored resin composition, the method comprising the steps of dehydrating a wet cake of a pigment having a moisture content within the range of 45 to 90 wt.% in a finely powdered state to such an extent that the resulting moisutre content is reduced from 2 to 19 wt.%, and simultaneously maintaining the pigment in said wet cake substantially unchanged in size and shape and non-agglomerated during said dehydrating.

14. A method according to claim 13, wherein said dehydrating is effected such that said 2 to 19 wt.% of moisture content is uniformly left in said composition.

15. A method of preparing a composition consisting essentially of pigment and water, the method comprising the steps of dehydrating a wet cake of a pigment having a moisture content exceeding 19 wt.% by effecting fine powdering of the wet cake to a finely powdered state to such an extent that the resulting moisture content is reduced to 2 to 19 wt.%, and simultaneously maintaining the pigment in said wet cake substantially unchanged in size and shape and non-agglomerated during said dehydrating, said composition being readily handeled and transported and not requiring intensive grinding or kneading and not requiring flushing when subsequently used in a colored resin composition.

16. A composition consisting essentially of pigment and water, said composition being made by dehydrating a wet cake of a pigment having a moisture content within the range of 45 to 90 wt.% by effecting fine powdering of the wet cake to a finely powdered state to such an extent that the resulting moisture content is reduced from 2 to 19 wt.%, and simultaneously maintaining the pigment in said wet cake substantially unchanged in size and shape and non-agglomerated during said dehydrating, said composition being readily handled and transported and not requiring intensive grinding or kneading and not requiring flushing when subsequently used in a colored resin composition.

17. A composition according to claim 16, wherein said 2 to 19 wt.% of moisture content is uniformly left in said composition.

18. A color resin composition comprising a pigment composition dispersed in a resin or coating composition, said pigment composition consisting essentially of a pigment and water, said pigment composition being made by dehydrating a wet cake of a pigment having a moisture content within the range of 45 to 90 wt.% by effecting fine powdering of the wet cake to a finely powdered state to such an extent that the resulting moisture content is reduced from 2 to 19 wt.%, and simultaneously maintaining the pigment in said wet cake substantially unchanged in size and shape and non-agglomerated during said dehydrating, said composition being readily handled and transported and not requiring intensive grinding or kneading and not requiring flushing when subsequently used in a colored resin composition.

19. A method according to claim 15, wherein said step of effecting fine powdering of the wet cake comprises charging said cake into a grinding machine and passing hot air into said grinding machine to thereby obtain said moisture content of 2 to 19 wt.%.

* * * * *